United States Patent
Araldi et al.

(10) Patent No.: US 9,555,395 B2
(45) Date of Patent: Jan. 31, 2017

(54) CHEMICALLY MODIFIED MYCOLOGICAL MATERIALS HAVING ABSORBENT PROPERTIES

(71) Applicants: Sarah Jane Araldi, Troy, NY (US); Gregory John Tudryn, Cohoes, NY (US); Courtney Elizabeth Hart, Adams, MA (US); Alex James Carlton, Troy, NY (US)

(72) Inventors: Sarah Jane Araldi, Troy, NY (US); Gregory John Tudryn, Cohoes, NY (US); Courtney Elizabeth Hart, Adams, MA (US); Alex James Carlton, Troy, NY (US)

(73) Assignee: ECOVATIVE DESIGN LLC, Green Island, NY (US)

( * ) Notice: Subject to any disclaimer, the term of this patent is extended or adjusted under 35 U.S.C. 154(b) by 273 days.

(21) Appl. No.: 14/448,285

(22) Filed: Jul. 31, 2014

(65) Prior Publication Data

US 2015/0038326 A1     Feb. 5, 2015

Related U.S. Application Data

(60) Provisional application No. 61/860,989, filed on Aug. 1, 2013.

(51) Int. Cl.
    *B01J 20/24*        (2006.01)
    *B01J 20/30*        (2006.01)

(52) U.S. Cl.
    CPC .............. *B01J 20/30* (2013.01); *B01J 20/24* (2013.01); *Y02E 50/16* (2013.01)

(58) Field of Classification Search
    CPC ........................................................ B01J 20/24
    USPC ........................................................ 502/404
    See application file for complete search history.

(56) References Cited

U.S. PATENT DOCUMENTS 6,402,953 B1 *    6/2002    Gorovoj .................. B01J 20/24
                                                  210/198.2

* cited by examiner

*Primary Examiner* — Edward Johnson
(74) *Attorney, Agent, or Firm* — Francis C. Hand; Carella, Byrne et al.

(57) ABSTRACT

A method of producing an absorbent biocompatible material which comprises mixing at least one mycological material, such as a fungus or fungal tissue, with at least one lignocellulosic material to provide a biocomposite material comprising the at least one mycological material and the at least one lignocellulosic material. The biocomposite material then is contacted with at least one substance that increases the hydrophilicity of the biocomposite material, thereby providing an absorbent biocomposite material that has a variety of uses, such as absorbent materials for use in vegetation propagation and preservation, animal bedding, animal litter, filler in diapers, cold chain materials for temperature regulation, ice packs, absorbent foams and mats, such as decorative floral arrangement foams, carpet mats, and absorbent booms applied to chemical spills.

19 Claims, No Drawings

CHEMICALLY MODIFIED MYCOLOGICAL MATERIALS HAVING ABSORBENT PROPERTIES

This application claims priority based on provisional application Ser. No. 61/860,989, filed Aug. 1, 2013, the contents of which are incorporated by reference in their entirety.

This invention relates to biocomposites formed from at least one mycological material and at least one lignocellulosic material. More particularly, this invention relates to contacting a biocomposite material as hereinabove described with at least one substance that increases the hydrophilicity of the biocomposite material, thereby providing an absorbent biocomposite material.

The present invention is directed to practices and materials that may be used to produce absorbent mycological composites used for vegetation propagation, vegetation preservation, filler in diapers, cold chain materials for temperature regulation, ice packs, absorbent foams and mats, such as decorative floral arrangement foams, carpet mats, and absorbent booms applied to chemical spills, among many other applications. The mycological biocomposites may be comprised of lignocellulosic waste materials, fungi and fungal cellular tissue, and potentially supplemental nutrients (minerals, vitamins, and the like) (See European Patent Application No. 2,094,856). Benign chemical treatments along with temperature regimes change the structure of the fungal cell wall to be hydrophilic.

The mycological biocomposites are compostable and are "green" alternatives" to products used currently in the industry, such as polyethylene plastic sleeves and trays, mineral fibers, synthetic chemical matrices, and the like. The biodegradable alternatives available on the market are produced mainly using peat moss, also known as Sphagnum moss, which has been termed a slow-renewable resource, (Crill, *Ambio*, Vol. 37, No. 6, pgs. 456-461, (2005) which causes environmental strain on the habitats from which the supplies are derived (Maria F. Diaz, *Chilean Journal of Agricultural Research*, Vol. 72, No. 2, (2012)). This technology may be used for applications currently employing non-renewable to slow-renewable substrates which require high-energy inputs, multiple costly ingredients, and undesirable chemical inputs.

Previous work has demonstrated successful functionalization of chitin, or derivatized chitinous biopolymer (i.e. chitosan) within or derived from the fungal cell wall (structural layer). This has the potential to introduce variations in functionalization while maintaining continuous, porous, or structural hyphal morphology (U.S. application Ser. No. 13/411,877). This remains valid in the event the fungal tissue, such as mycelial tissue, is grown into a biocomposite, or combined with lignocellulosic waste and/or combinations of other additives. Chemical modifications are feasible due to functional groups on the hyphal cell, such as primary amine as well as primary and secondary hydroxyl groups on chitin monomer repeating structure (V. K. Mourya, *Reactive and Functional Polymers*, Vol. 68, pgs. 1013-1053, (2008)); (Kurita, *Prog. Polymer Sci*, Vol. 26, pgs. 1921-1971, (2001)); (Kumer, *Reactive and Functional Polymers*, Vol. 46, pgs. 1-27, (2000)), while similar additional functionalities may be found on less structural cell components such as beta-glucans.

Previous work developing chitin/chitosan usage focuses universally on solvation followed by recovery of the polymer, ultimately disrupting the original structure and morphology of the biopolymer considerably (Austin, U.S. patent application Ser. No. 05/659,280, 1977). Other compounds often associated with the fungal cell wall include proteins, minerals, and other polysaccharides (Bartnicki-Garcia, *Ann. Rev. Microbiol.*, Vol. 22, pgs. 87-108, (1968)). These have the potential to interfere constructively or destructively with functionalization and characterization of the material and can be minimized using preprocessing chitin purification.

The chitinous exterior of prepared cells can be functionalized in a variety of ways, resulting in modified physical characteristics of the fungal chitin (or chitosan) and subsequently, designed control over bulk properties of the biomaterial. This practice proposes a series of functionalization pathways upon the nitrogen and hydroxyl sites on fungal chitin and chitosan. The method described here can be applied to any species of fungi and tailored to yield the desired extent, or combination of modifications thereof. These methods offer additionally applicability towards functionalization of the aforementioned fungal cell components, either independently, additionally, or in concert with such described methods for fungal chitin characterization.

In accordance with an aspect of the present invention, there is provided a method of producing an absorbent biocomposite material. The method comprises mixing at least one mycological material and at least one lignocellulosic material to form a biocomposite material comprising the at least one mycological material and the at least one lignocellulosic material. The biocomposite material then is contacted with at least one substance that increases the hydrophilicity of the biocomposite material, thereby providing an absorbent biocomposite material.

Although the scope of the present invention is not to be limited to any theoretical reasoning, the cell walls of mycotic organisms, such as fungi, contain chitin and/or its deacetylated derivative chitosan. Some fungi also contain varying amounts of hydrophobic proteins and/or combinations of structural glucans. By contacting the biocomposite with certain substances that will be described hereinbelow, the chitin and/or chitosan, as well as any hydrophobic proteins and/or any other hydrophobic compounds contained in the fungi, are converted to more hydrophilic derivatives of such compounds, thereby making the biocomposites more absorbent, or more receptive to water and other liquids. Such biocomposites thus become desirable for a variety of uses, as will be described in further detail hereinbelow.

In a non-limiting embodiment, the at least one mycological material is at least one fungus or fungal tissue. The term "fungal tissue," as used herein, mean any tissue, part, or cell, of a fungus, such as, for example, the mycelium, as well as vegetative and reproductive structures, such as primordia, the fruiting body, and spores. The at least one fungus or fungal tissue may be a live fungus or fungal tissue, or may be an inactivated, or dead, fungus, or may be inactivated, or dead, fungal tissue.

Fungi or fungal tissue are contained in the absorbent biocompatible material of the present invention include, but are not limited to, those selected from the phyla Ascomycota, Zygomycota, Basidiomycota, and combinations thereof, or of the species *Pleurotus ostreatus, Polyporus squamosus, Rhizopus microspores* var. *oligosporus, Ganoderma lucidum*, or *Schizophyllum commune*, or combinations thereof.

In a non-limiting embodiment, the at least one fungus or fungal tissue is of the species *Pleurotus ostreatus*.

In another non-limiting embodiment, the at least one fungus or fungal tissue is of the species *Polyporus squamosus*.

In a further non-limiting embodiment, the at least one fungus or fungal tissue is of the species *Rhizopus microspores* var. *oligosporus*.

In yet another non-limiting embodiment, the at least one fungus or fungal tissue is of the species *Ganoderma lucidum*.

In yet another non-limiting embodiment, the at least one fungus or fungal tissue is of the species *Schizophyllum commune*.

It is to be understood, however, that the scope of the present invention is not to be limited to any particular fungus or fungal tissue.

Lignocellulosic materials which may be contained in the absorbent biocomposite material of the present invention including, but are not limited to, wood, including but not limited to, wood chips, sawdust, and wood "flour", and plant materials such as corn fibers, corn stover, grains, and grain hulls such as rice hulls, oat hulls, and wheat hulls, processed lignin or cellulose based materials such as, but not limited to, woven and non-woven textiles, pulped or flocked materials such as mats, sheets, boards, and the like, and other fruit and vegetable plant materials.

In a non-limiting embodiment, the at least one lignocellulosic material is wood.

In another non-limiting embodiment, the at least one lignocellulosic material comprises corn fibers.

In another non-limiting embodiment, the at least one lignocellulosic material comprises grain hulls.

In yet another non-limiting embodiment, the grain hulls are selected from the group consisting of rice hulls, oat hulls, and mixtures thereof.

It is to be understood, however, that the scope of the present invention is not to be limited to any particular lignocellulosic material.

As noted hereinabove, the biocomposite material comprising the mycological material and the lignocellulosic material is contacted with at least one substance that increases they hydrophilicity of the biocomposite material to provide the absorbent biocomposite material of the present invention. Such substances include, but are not limited to, bases, including alkali hydroxides such as, for example, sodium hydroxide and potassium hydroxide, amines, sodium borohydrate, carboxymethyl acid, carboxymethyl chloride, surfactants, humectants, polyol molecules that interact with chitin and/or chitosan, glycerol, sorbitol, plasticization agents such as triglyceride plasticizers, oils such as linseed oil, linoleic acid, drying oils, ionic and/or non-ionic glycols, alkyloxides, polyol monomers, oligomers, polymers, copolymers and networks, salts, ionic liquids, and combinations thereof. When more than one of such substances is used to contact the biocomposite material, such substances may contact the biocomposite material simultaneously, or in a stepwise manner.

In a non-limiting embodiment, the at least one substance that increases the hydrophilicity of the biocomposite material is a base.

In another non-limiting embodiment, the at least one substance that increases the hydrophilicity of the biocomposite material is an alkali hydroxide. In one non-limiting embodiment, the alkali hydroxide is sodium hydroxide. In another non-limiting embodiment, the alkali hydroxide is potassium hydroxide.

In yet another non-limiting embodiment, the at least one substance that increases the hydrophilicity of the biocomposite material is an amine.

In a further non-limiting embodiment, the at least one substance that increases the hydrophilicity of the biocomposite material is sodium borohydrate.

As noted hereinabove, the at least one substance that increases the hydrophilicity of the biocomposite material may react or interact with the chitin and/or chitosan in the fungus or fungal tissue, to produce hydrophilic derivatives of the chitin and/or chitosan in the fungus or fungal tissue, and also may react or interact with hydrophobic proteins and/or polypeptides and/or other hydrophobic materials in the fungus or fungal tissue in order to form more hydrophilic forms of these materials.

In a non-limiting embodiment, the biocomposite material is contacted with sodium hydroxide and carboxymethyl chloride, in the presence of isopropanol at 37° C., whereby the chitin in the fungus is converted to carboxymethyl chitin according to the following equation:

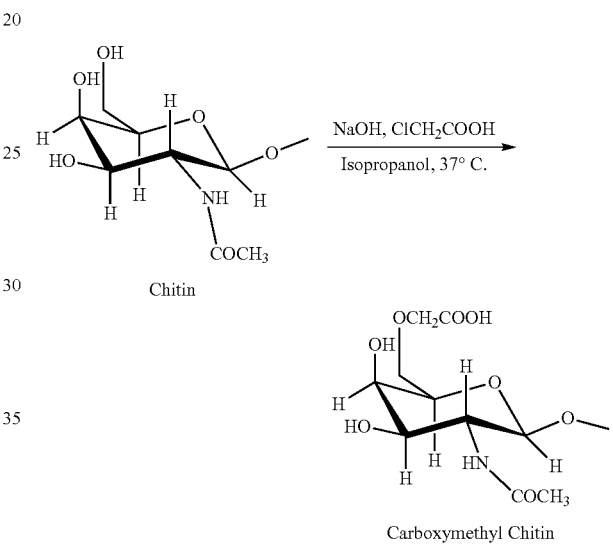

In another non-limiting embodiment, chitosan is reacted to produce N-carboxymethyl chitosan according to the following mechanism:

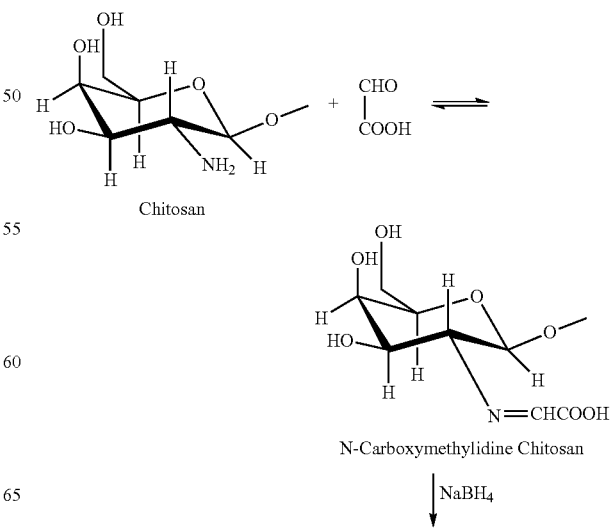

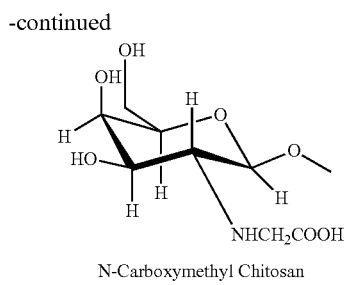

N-Carboxymethyl Chitosan

In further non-limiting embodiments, the following reactions with the chitin or chitosan in the fungus and/or fungal tissue in the biocomposite may be effected to increase the hydrophilicity of the biocomposite.

A. Quaternization of Chitin and/or Chitosan i. Introduction of an ionic charge to the pendant nitrogen ii. Can be performed through introduction of acids, which may vary counterion moiety, and may be ion-exchanged selectively iii. Can be performed through alkylation, where a N—C bond occupies a fourth bond to nitrogen, imparting charge and counterion, which may be chosen or exchanged selectively.

iv. Any combination of protonation or alkylation thereof.

Variations of quaternization (methylation) of amino groups in derivatized chitin (chitosan) can be obtained using methyl iodide in an alkaline solution of N-methyl pyrrolidone. (Thanou, et al., *J. Controlled Release*, Vol. 64, pg. 15 (2000); Sieval, et al., *Carbohydr. Polym.*, Vol. 36, pg. 157 (1998)). Chitosan, and salts of chitosan, such as hydrochloride and glutamate are shown to be absorption enhancers for the protein and peptide drugs. (Illum, et al., *Pharm. Res.*, Vol. 11, pgs. 1186 (1994); Aspden, et al., *J. Pharm. Sci.*, Vol. 4, pg. 23 (1996); Borchard, et al., *J. Controlled Release*, Vol. 39, pg. 131 (1996)).

The cationic character of chitosan may be modified to highly cationic for application in uses such as absorption enhancement. Functionalizing fungal chitin/chitosan may also be done to yield "highly quaternized" derivatives. A non-limiting example is a trimethyl scenario such as alkylation, followed by quaternization. Alkylation without quaternization also is a desirable non-quaternized pathway performed on fungal, such as mycelial, chitin.

Functionalizing to form highly cationic derivatives of chitosan may be performed by reacting fungal chitosan and dialkylaminoalkylchloride under alkaline conditions. (Je, et al., *Bioorg. Med. Chem.*, Vol. 14, 5989 (2006). Chitosan derivatives of dialkylaminoalkyl type with N-aminoethyl, N-diethylaminoethyl, N-dimethylaminoethyl, or N-dimethylaminoisopropyl groups also display significant cytotoxic activity. (Lee, et al., *Bioorg. Med. Chem. Lett.*, Vol. 12, pg. 2949 (2002); Je, et al., *Bioorg. Med. Chem.*, Vol. 13, pg. 6551 (2005)).

For example, chitosan and methyl iodide are reacted in NaOH, NaI, at 60° C. in solvent (e.g., NMP). Ion exchange can be performed via traditional column or solvent methods, if necessary or desired. Non-limiting examples of producing cationic derivatives of chitosan are shown in the following reaction mechanisms:

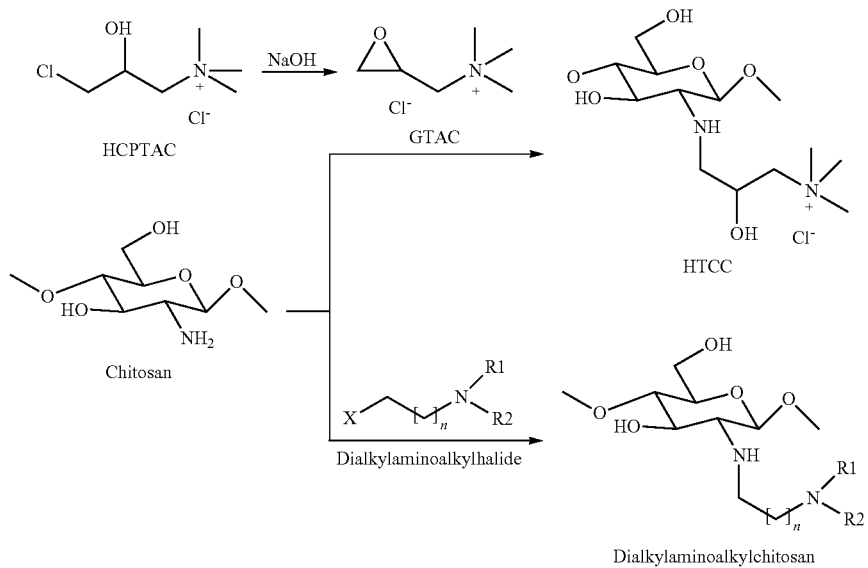

HTPAC=2-hydroxy-3-chloro propyltrimethyl ammonium chloride, GTAC=glycidyl-trimethyl-ammonium chloride, HTC=N-(2-hydroxyl) propyl-3-trimethylammonium chitosan chloride. (Mourya, 2008).

Alkylation of chitosan followed by quaternization. (Mourya, et al., 2008).

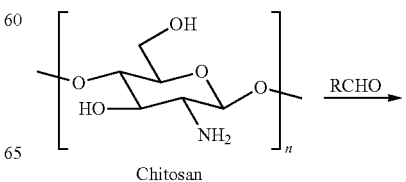

B. Epoxide Reagents
i. Attachment of pendant (or cross-linking) chemical unit using epoxide (oxirane) ring opening functionality.
ii. Ring opening mechanism is likely to favor reacting with nitrogen near pH~7.

Hydroxyalkyl chitosans derivatized from fungal tissue may be obtained through reaction of chitosan with epoxides (ethylene oxide, propylene oxide, butylene oxide) and glycidol. Depending on the epoxide, and solvent and temperature conditions, the reaction may take place predominantly at the amino or alcohol group, yielding N-hydroxyalkyl or O-hydroxyalkyl chitosans or a mixture of both. (U.S. Pat. Nos. 4,780,310; 4,845,204; 4,931,271 and 6,090,928).

Non-limiting examples of reacting chitosan with opoxides are shown in the reaction mechanisms below. Under certain conditions, substitutions higher than 2 degrees may occur.

C. Aldehyde or Vinyl Reagents
  i. Unhydrogenated C=C (e.g. double) bonds, i.e. vinyls, aldehydes, or dienes (terminal, or mid-chain groups) used to react with pendant N site of the chitinous polymer.
  ii. May be higher degrees of functionality than 1, e.g. glutaraldehyde.

The primary amino group of chitosan in derivatized fungal tissue, such as mycelial tissue, may be subjected to a Schiff reaction with aldehydes or ketones to yield the corresponding aldimines and ketimines. Such moieties may be converted to N-alkyl derivatives upon hydrogenation with borohydride. (Hirano, et al., *Carbohydr. Polym.*, Vol. 38, pg. 293 (1999); Moore, et al., Int. *J. Biol. Macromol.*, Vol. 3, pg. 337 (1981)). The alkyl chitosan can be subjected to quaternization to provide a glutaraldehyde cross-linked chitosan, for example.

D. Acryl (Acryloyl, Acrylate) Agents
  i. Acrylate reactive groups where C=C double bond is capable of electrophilic addition, and C=O bond is capable of nucleophilic substitution, such as in esters.
  ii. Diacrylates, or higher functionality acryl moieties may be used additionally to adjust physical performance.

Derivatized fungal chitosan, such as mycelial chitosan, may be subjected to a Michael reaction of various acryl reagents. (Sashiva, et al., *Biomacromolecules*, Vol. 4, pg. 1250 (2009)). In order to induce water solubility, various acryl reagents can be used with this reaction type using a range of functional groups. Such reagents applicable to this facile procedure are hydroxyethyl acrylate, hydroxypropyl acrylate, acrylamide, acrylonitrile, and PEG-acrylate. The reaction of chitosan with acrylonitrile produces cyanoethyl chitosan, whereas the reaction of chitosan with ethyl acrylate in an aqueous acidic medium produces an N-carboxyethyl ester intermediate. If desired or necessary, this may be hydrolyzed to a free acid or utilized as a means to substitute with various hydrophilic amines, without the use of protecting groups. (Sashiwa, et al., *Carbohydr. Res.*, Vol. 338, pg. 557 (2003)). Non-limiting examples of acylation of chitosan are shown in the following reaction mechanisms. (Mourya, 2008).

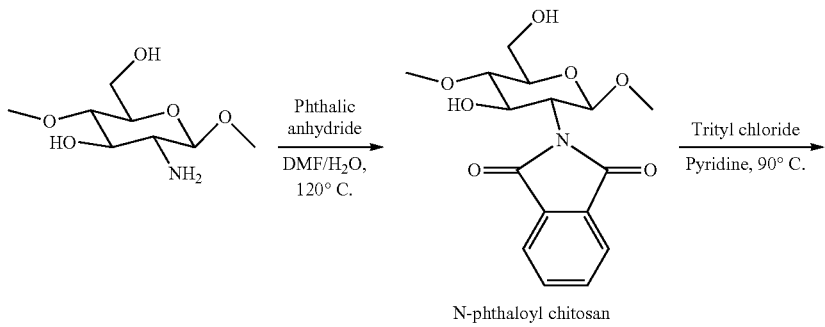

N-phthaloyl chitosan

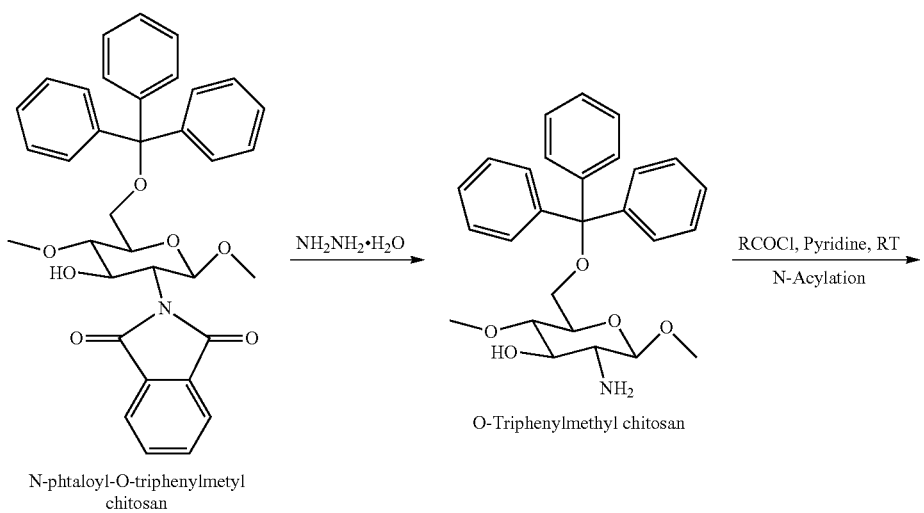

N-phtaloyl-O-triphenylmetyl chitosan

O-Triphenylmethyl chitosan

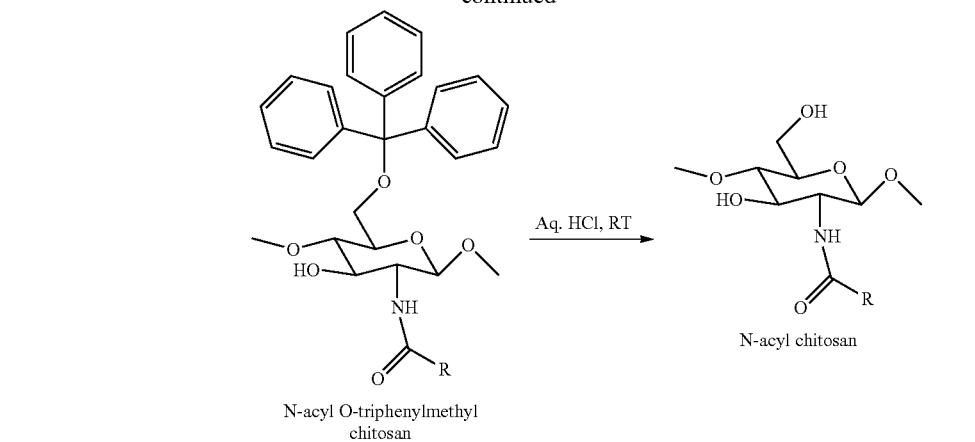
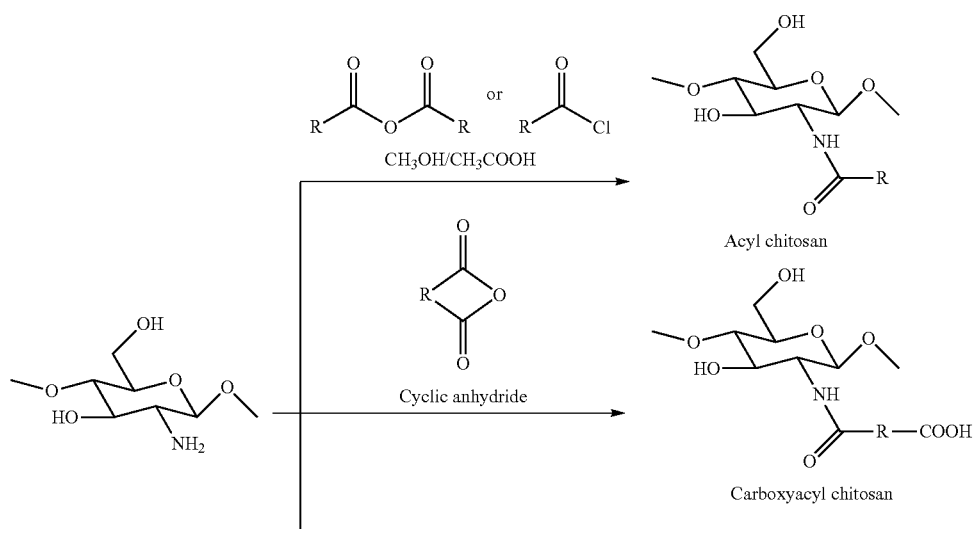
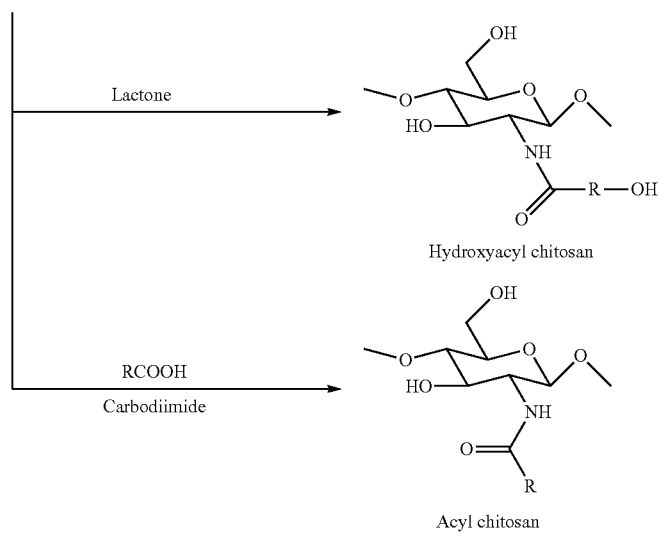

E. Carboxylation Reagents
  i. Incorporation of carbonic (often acidic) groups on the chitin backbone.
  ii. N-carboxylation may also use carboxyaldehydes in a reductive amination sequence.

Carboxyalkylation introduces acidic groups on the fungal, such as mycelial, chitin or chitosan structure. Carboxyl groups may be added to the amino groups of chitosan, and amphoteric polyelectrolytes containing both cationic and anionic fixed charges may be prepared. The degree of substitution may be varied to obtain targeted charge densities on the fungal, such as mycelial, chitin/chitosan, and may impart control of pH-dependent material behavior.

N-carboxyalkyl and O-carboxyalkyl chitosan derivatives of fungal, such as mycelial, chitin may be obtained through variation of reaction conditions using monohalocarboxylic acid to target reaction on N versus OH sites. (Kim, et al., *J. Ind. Eng. Chem.*, Vol. 4, pg. 19 (1998); Liu, et al., *J. Appl. Pol. Sci.*, Vol. 79, pg. 1234 (2001)). Another possible variant for N-functionalization uses carboxyaldehydes in a reductive amination sequence. (Muzzarelli, et al., *Carbohyd. Res.*, Vol. 107, pg. 199 (1982)).

Functionalized fungal chitin, such as N,N-dicarboxymethyl chitosan, is likely to provide good chelating abilities. For example, its chelate with calcium phosphate may favor osteogenesis and promote bone mineralization. (Muzzarelli, et al., *Carbohydr. Polym.*, Vol. 36, pg. 267 (1996)). Non-limiting examples of the carboxylation of chitosan are shown in the following reaction mechanisms. (Mourya, 2008).

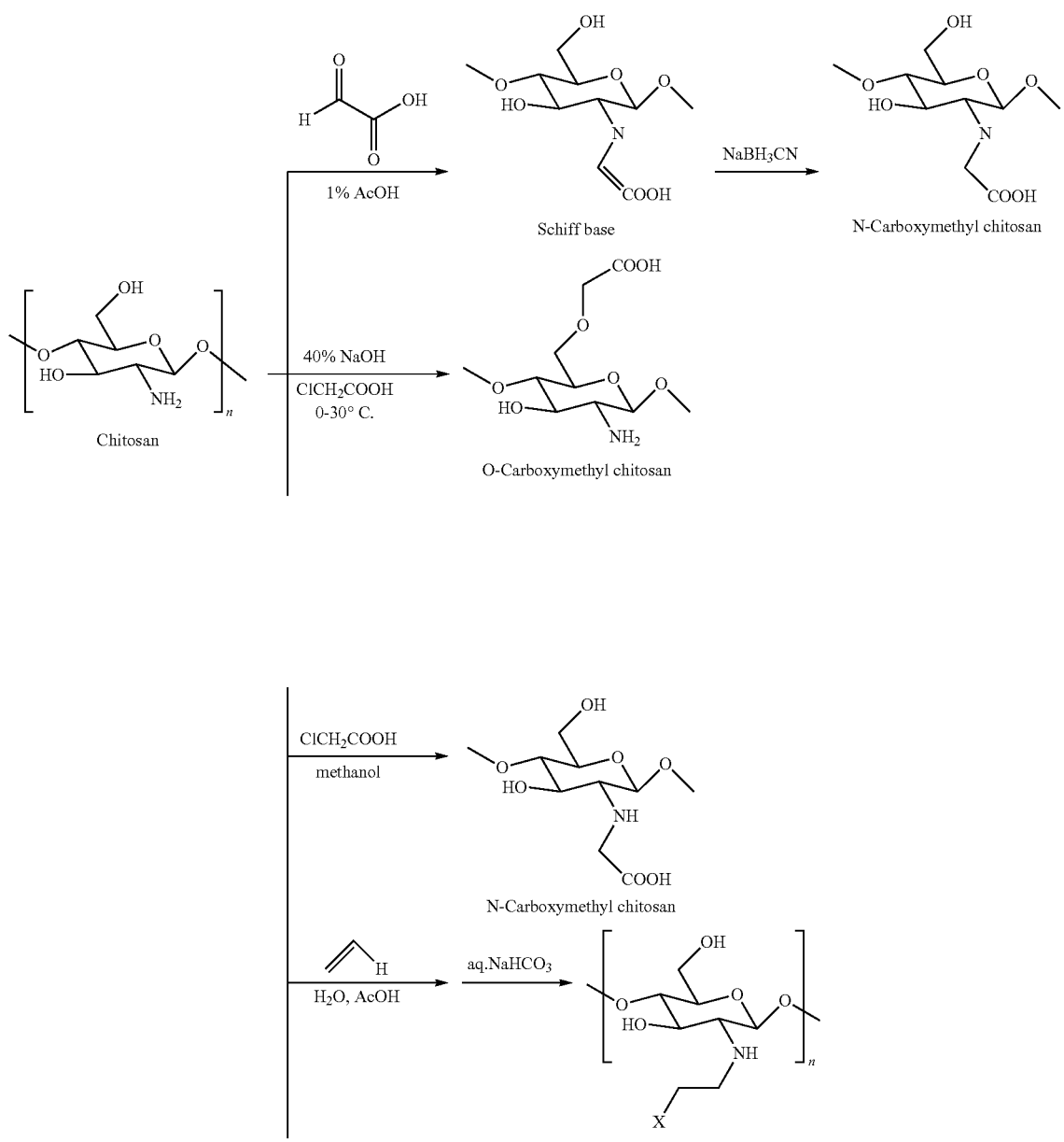

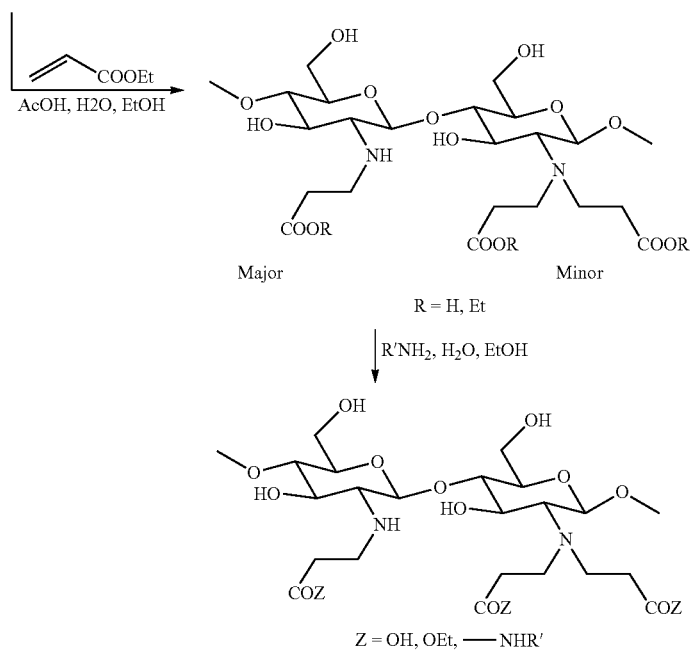

R = H, Et

Z = OH, OEt, —NHR'

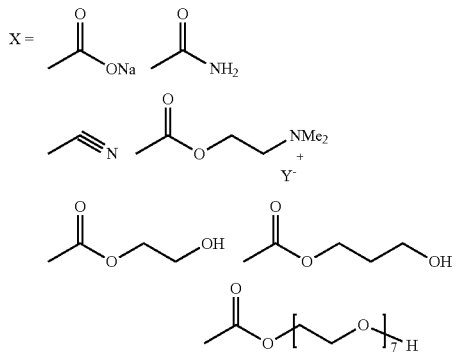

F. Cyclodextrin Reagents
i. Cyclodextrin (CD) may be linked to fungal, such as mycelial, chitosan by the reductive amination using formylmethylene cyclodextrin
ii. Fungal, such as mycelial, chitin may be grafted using tosylated cyclodextrin
iii. Cyclodextrin may be added onto chitinous fungal, such as mycelial, tissue via a nucleophilic substitution reaction such as using a monochlorotriazinyl derivative of cyclodextrin
iv. Cyclodextrin may be added to fungal, such as mycelial, tissue via epoxy-activated chitosan
v. Cyclodextrin may be added to chitinous fungal, such as mycelial, tissue by using a redox aminated cyclodextran (e.g. mono-6-amino-mono-6-deoxy-b-cyclodextrin)
vi. Cyclodextrin-citrate or itaconate may be used for condensation of cyclodextrin onto fungal, such as mycelial, chitin/chitosan.
vii. Cyclodextrin may be bound to derivitized fungal, such as mycelial, chitin through a cross-linking scheme, such as cyclodextrin cross-liking to chitosan by glutaraldehyde or other bridging molecules.

Fungal tissue, such as mycelial tissue, deacytylated to chitosan may be functionalized using cyclodextrin pendant groups with an aim to combine the properties of chitosan and the unique abilities of cyclodextrin. Subsequently the complex structure is capable of forming non-covalent inclusion complexes with a number of targeted molecules altering their physicochemical properties.

Non-limiting examples of preparing cyclodextrin linked chitosan by reductive amination, tosylated cyclodexrin, nucleophilic substitution reaction, epoxy-activated chitosan, redox aminated cyclodextrin, condensation of cyclodextrin-citrate, or cross-linking of cyclodextrin to chitosan using glutaraldehyde are shown in the following reaction mechanisms. (See also Moruya, 2008.)

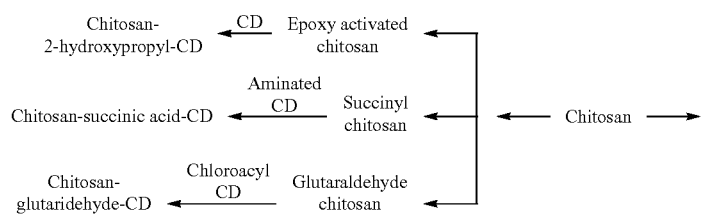
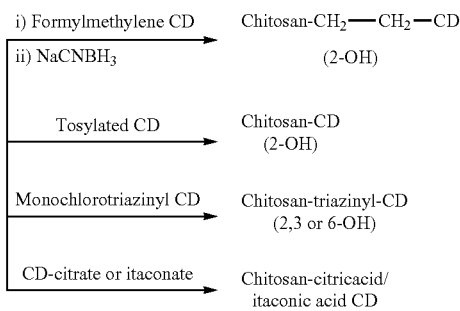

G. Graft Polymerization
i. Graft polymerization onto fungal, such as mycelial, chitin or chitosan may utilize the aforementioned reactive groups, in combination, or sequence to provide a pendant site for continued polymerization steps such as traditional addition or condensation polymerizations (e.g. polylactic acid or polyaniline-grafted chitosan).
ii. Graft molecules may be used as bridging molecules between fungal, such as mycelial, chitosan-chitosan (intra and inter chain) to form a network of chemical, physical, or ionic crosslinks, or gelation.
iii. Graft copolymerization between chitosan and other reactive groups, where graft copolymers acts as extenders, crosslinkers or crosslinkers between mycelial chitin and the targeted chemical group.
iv. Graft copolymerization upon mycelial chitin to provide branching polymers or dendrimer-like grafting to change physical performance through physical entanglements, chemical or ionic crosslinking, or the like.
v. Subsequent reactions may include esterification, radical polymerization, other condensation reactions, or addition reactions.

Grafting of copolymers or graft polymerization onto fungal, such as mycelial, chitin or chitosan may be done to alter material properties, such as increasing electrical and/or ionic conductivity (e.g. polyaniline, emaraldine grafting, (Tiwari, et al.; EXPRESS Polymer Letters 1.5, pgs. 308-317 (2007)), as well as increasing hydrophilicity (e.g., lactic acid). Condensation of polylactide may be performed using the catalyst 4-dimethylaminopyridine where polylactide was grafted using the hydroxyl groups of phthaloylchitosan. (Feng, et al., Carbohydr. Polym., Vol. 70, pg. 258 (2007); Qu, et al., J. Appl. Polym. Sci., Vol. 74, pg. 3186 (1999)).

Grafting through the use of aldehyde chemistry, or the like, may be used to form chitosan-chitosan bridging, both intra and inter-chain, thereby altering network structure and performance, or providing a gelation scenario. Graft polymerization may perform as chain extenders between chitosan and other reactive groups, which can be used in crosslinking, branching, or dendrimer schemes, or combinations thereof.

H. Chelating Chemistries Providing Specific Interactions Towards Remediation
i. Crown ether modification to fungal, such as mycelial, chitin for selectivity for metal ions
ii. Other chemical groups may be grafted in a similar manner toward affinity binding, or adsorbing through enhanced surface area, as remediative modifications to chitin in fungal, such as mycelial, tissue.

Fungal chitosan, such as mycelial chitosan, may be modified to contain chelating chemistries (polar, ionic, affinity, or adsorptive) specific towards interaction with environmentally or biologically harmful materials. Crown ethers have particular molecular structures which exhibit complexing selectivity for metal ions. Crown ether-bound fungal, such as mycelial, chitosan will have a stronger complexing capacity and selectivity for metal ions because of the combination of selectivity and high molecular weight. Crown ether chitosan may be prepared using a Schiff's type base and its reduced form. (Tang, et al., J. Appl. Poly. Sci., Vol. 83, pg. 1886 (2002). Crown ether-bound chitosans provide adsorption capacities for metal ions such as $Pd^{2+}$, $Au^{3+}$, and $Ag^+$, and also selectivity for $Pd^{2+}$ adsorption in the presence of $Cu^{2+}$ and $Hg^{2+}$. Cross-linked forms of crown-ether fungal, such as mycelial, chitosan may also be prepared. (Wan, et al., J. Appl. Poly Sci., Vol. 84, pg. 29 (2002)).

In a non-limiting embodiment, crown ether-bound chitosan may be produced according to the following reaction mechanism. (Mourya, 2008).

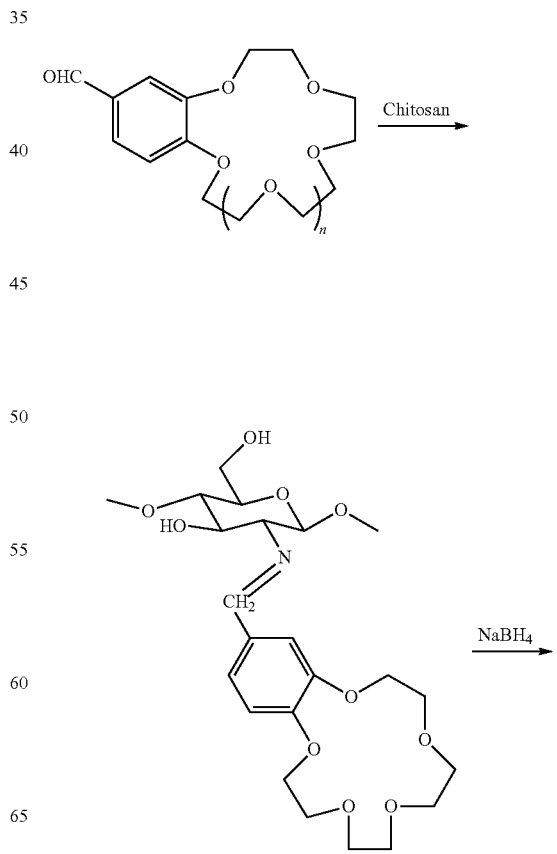

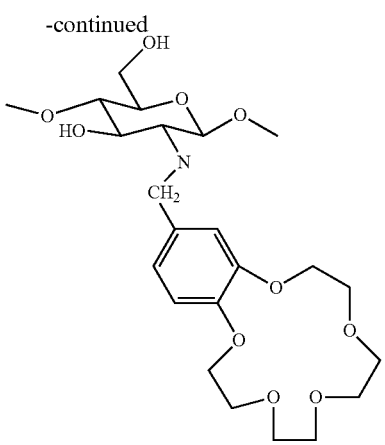

I. Other Miscellaneous Derivatizations of the Chitin or Chitosan in the Fungus or Fungal Tissue, Such as Mycelial Tissue, Include the Following:
  i. Thiolated chitosan
  ii. Thiourea chitosan
  iii. Succinyl chitosan
  iv. Sulfated chitosan
  v. Azidated chitosan
  vi. Phosphorylated chitosan
  vii. Pegylated chitosan
  viii. Peptide grafted chitosan
  ix. Enzymatically modified chitosan
  x. Weakly binding ion (ionic liquid) functionalized fungal, such as mycelial, chitin/chitosan In further non-limiting embodiments, one or more of the following reaction schemes (or the like) may be used for reaction with fungal or fungal tissue (including the mycelium) chitinous primary, secondary, or terminal functionality in sequence, preparation, or combination thereof, with or without amine reactions.

J. Carboxymethyl Reagents
  Incorporation of carbonic (often acidic) groups on the chitin backbone using the OH functionality O-Carboxymethyl chitosan exhibits hydrophilicity, and may also exhibit hygroscopicity, and antibacterial activity, depending upon degree of functionalization.

K. Epoxide Reagents
  i. Attachment of pendant (or cross-linking) chemical unit using epoxide (oxirane) ring-opening functionality
  ii. Ring-opening mechanism is likely to favor reacting with nitrogen near pH>10.
  iii. Imbuing mycological material with epoxide, or the like, functional reagents to provide surface coating, or interpenetrated network(s) and subsequently actively or passively applying activation (heat, electromagnetic radiation, redox reagents), or time, to establish bonds on the surface or penetrated throughout the mycological composite.

Hydroxyalkyl chitosans derivatized from fungal, such as mycelial, tissue may be obtained through reaction of chitosan with epoxides (ethylene oxide, propylene oxide, butylene oxide) and glycidol. Depending on the epoxide and solvent and temperature conditions, the reaction may take place predominantly at the amino or alcohol group, yielding N-hydroxyalkyl or O-hydroxyalkyl chitosans or a mixture of both. (U.S. Pat. Nos. 4,780,310; 4,845,204; 4,931,271; and 6,090,928). The ratio of O/N-substitution (hydroxypropylation of chitosan by propylene oxide) is determined by choice of catalyst (NaOH or HCl) and reaction temperature. (Maresh, et al. in Skjaln-braek, et al., Eds., *Chitin and Chitosan*, Elsevier Applied Sciences, London, pg. 389 (1989)).

In a non-limiting embodiment, chitosan is reacted with epoxide (oxirane terminated reactive group), such as glycidol performed under alkali conditions (in NaOH solution).

L. Hydroxyalkyl Reagents
With basic catalysis, O-alkylation is preferred with a tendency to yield oligomers at temperature higher than 40° C. (Maresh, et al., 1989), such as O-hydroxyethylchitosan (glycol chitosan) by reaction with 2-chloroethanol in alkaline medium. (Ronghua, *Carbohdr. Polymers*, Vol. 51, pg. 431 (2003); Xie, et al., *Carbohydr. Polym.*, Vol. 69, pg. 142 (2009)). (glycol chitin, hydroxyethyl chitin, hydroxypropyl chitin, hydroxybutyl chitin).

M. Miscellaneous Alcohol Reactions
Fungal, such as mycelial, chitin or chitosan hydroxyls may undergo oxidation to give aldehydes, ketones, or carboxylic acids, or dehydrated to alkenes. They can react to form ester compounds, and can undergo nucleophilic substitution if activated.

It should be noted that all chemical modifications (naturally, synthetically, or enzymatically derived) may be executed in varying levels of functionality (i.e., substitutions may range from 0 to 1 to 2 or higher), e.g., bifunctional or higher to involve reactive steps intra or inter-chitinous polymer chain linking to impart targeted chemical modification characteristics, and effect network structure and performance.

It is to be understood, however, that the scope of the present invention is not to be limited to any particular substance employed to increase the hydrophilicity of the biocomposite material, or to any particular reaction or reaction mechanism.

The biocomposite materials, depending upon their end use, also may contain, or may be treated with, a variety of other materials. Such materials include, but are not limited to, materials that increase the electrical and/or ionic conductivity of the biocomposite material, hydrophilic polymers, nutrients such as $NH_4$ and $PO_4$, antimicrobial agents such as metal salts, xylose, textiles, and adhesives. Such materials may be added at any stage of the method of the present invention, such as prior to mixing the at least one mycological material with the at least one lignocellulosic material, or concurrently with mixing the at least one mycological material with the at least one lignocellulosic material, or after mixing the at least one mycological material with the at least one lignocellulosic material but prior to contacting the biocomposite material with the at least one substance that increases the hydrophilicity of the biocompatible material, or concurrently with contacting the biocomposite material with the at least one substance that increases the hydrophilicity of the biocomposite material or subsequent to contacting the biocomposite material with the at least one material that increases the hydrophilicity of the biocomposite material.

In addition, the biocomposite material may be subjected to one or more treatments such as, but not limited to, heating, compressing and/or compacting, chilling, electrolyzing, dehydration, and/or drying, depending upon the end use. Such treatments may occur at any stage of the method of the present invention, as hereinabove described.

The biocomposite materials formed in accordance with the method of the present invention may be formed into a variety of products. Such products include, but are not limited to, absorbent foams or mats, such as decorative and floral arrangement foams, oil absorbent booms, absorbent rugs, padding used underneath carpet and rugs, and absorbent matting, granular absorbents, including those used as animal litter (e.g., cat litter) or spill mitigation, absorbent fillers for diapers, padding for beds, including hospital beds, soilless vegetation growth media, growth encasements, and temperature regulation products, such as cold chain materials for temperature regulation, and ice packs.

In a non-limiting embodiment, when the product is an absorbent foam or mat, a selected lignocellulosic substrate material, nutrient medium, other additives, and water are mixed at specified ratios. Any chemical pretreatments deemed necessary then are conducted, and the resulting substance is autoclaved. Then, a desired fungus and/or fungal tissue is added to the lignocellulose-containing material at a desired ratio, and the resulting biocomposite material is incubated for a desired time if necessary. The biocomposite material then may be immersed in an appropriate reagent solution, and a vacuum may be applied if desired. If desired, the biocomposite material may be heated, chilled, or electrolyzed, and then dehydrated of dried. If the biocomposite is dehydrated, such dehydration will place any live fungi, if used, in a state of suspended animation. If the biocomposite material is dried, such drying will inactivate any live fungi, if used.

In another non-limiting embodiment, the biocomposite material may be formed into a soilless vegetation growth medium in a manner similar to that employed for forming absorbent foams or mats, except that the biocomposite material is molded into a desired embodiment of a soilless growth medium. Such soilless growth media may be used for flower arrangements, or in hydroponic growth applications, or for propagating and/or preserving vegetation, and/or for growing seedlings.

The soilless vegetation growth medium formed from a biocomposite of the present invention also may include nutrients (e.g., $NH_4$, $PO_4$), antimicrobial agents (e.g., metal salts, xylose) benign chemicals, textiles and/or adhesives.

In another non-limiting embodiment, the biocomposites of the present invention may be produced as hereinabove described with respect to the production of absorbent foams and mats, but are molded into growth encasements, such as pressed peat pots and grow "collars".

In another non-limiting embodiment, the biocomposite material of the present invention is produced as hereinabove described with respect to the production of absorbent foams and mats, except that the biocomposite material is processed into particles or pellets that allow the biocomposite material to be used as a granular absorbent that may be used as animal (e.g., dogs, cats, horses, cows, hamsters, gerbils, guinea pigs, sheep, goats, pigs, mules, donkeys, lizards, snakes, etc.) bedding, or animal litter.

In another non-limiting embodiment, the biocomposite material of the present invention is produced as hereinabove described with respect to the formation of absorbent foams and mats, except that the biocomposite material is treated with carboxymethylation agents and/or treated with aqueous or non-aqueous solutions to allow the biocomposite material to retain water while not freezing.

EXAMPLES

The invention now will be described with respect to the following examples. It is to be understood, however, that the scope of the present invention is not intended to be limited thereby.

Example 1

Absorbent Foams or Mats

A blend of fine grade wood "flour", or sawdust, waste from the furniture-making industry, is added to an autoclavable bag. 2 liters of tap water are added, and micronutrients are added at a rate specific to the fungus that is used, thereby forming a wood flour substrate.

The bag is folded over, closed securely with autoclavable tape, and sterilized in a pressure cooker at 15 psi and 240° F. for 60 minutes. The bag then is cooled to room temperature, and then is sprayed with 70% isopropyl alcohol and placed in a laminar flow hood. A bag of *Pleurotus ostreatus* grain inoculum, a mixing bowl, polyethylene molds, and a scale also are cleaned and sprayed and placed in a laminar flow hood.

The inoculum of *Pleurotus ostreatus* then is added to the wood "flour" in an amount of 180 grams per 2.5 liters of the wood "flour" substrate.

The mixture of wood "flour" substrate and *Pleurotus ostreatus* is placed in polyethylene molds, and then allowed to incubate for 6 days. Upon full colonization, the resulting biocomposites are ejected from the molds and go through chemical treatments. Each block of biocomposite is submerged in a mixture of 0-100 g polyoxylalkane, 1-1,500 ml alkaline solution, and 0-100 g of organic acid (e.g., acetic acid, ascorbic acid, or the like), for 3 hours. Each block then is rinsed in cold tap water. The biocomposites than are dried at 200° F. or above for up to 48 hours.

Example 2

Soilless Vegetation Growth Medium

A blend of fine grade corn fibers, waste from the agricultural industry, is added to an autoclavable bag. 1.5 liters of tap water are added, and micronutrients are added at a rate specific for the fungus that is used. The fine corn fibers then are soaked in 0-3,000 ml of saccharide (e.g., monosaccharide, oligosaccharide, or polysaccharide) and/or carbohydrate medium for 1 to 72 hours.

The bag then is folded over, closed securely, and sterilized in a pressure cooker at 15 psi and 240° F. for 60 minutes. If textiles are to be added, they are sterilized under the same conditions.

Once the substrate containing the corn fibers is cooled to room temperature, the bag is sprayed with 70% isopropanol and placed in a laminar flow hood. A bag of *Pleurotus ostreatus* grain inoculum, a mixing bowl, polyethylene molds, textiles (if used), and a scale also are cleaned and sprayed and placed in a laminar flow hood.

The inoculum of *Pleurotus ostreatus* then is added to the corn fiber substrate in an amount of 180 g per 2.5 liters of corn fiber substrate. The mixture of corn fiber substrate and *Pleurotus ostreatus* inoculum then is formed in polyethylene molds, which may be lined with textiles, and then allowed to incubate for 6 days. Upon full colonization, the bicomposites are ejected from the molds. The biocomposites then are dried at 200° F. for up to 48 hours.

Example 3

Growth Encasements

A substrate including a blend of rice hull and oat hull, waste from the agricultural industry, is added to an autoclavable bag. 1.25 liters of tap water are added to the autoclavable bag, and micronutrients are added at a rate specific to the fungus that is used.

Each bag of the rice hull and oat hull substrate is folded over, closed securely with autoclavable tape, and sterilized in a pressure cooker at 15 psi and 240° F. for 60 minutes. Textiles also are sterilized under the same conditions.

Once the rice hull and oat hull substrate is cooled to room temperature, the bag is sprayed with 70% isopropanol and placed in a laminar flow hood. Also cleaned and sprayed, and placed in the laminar flow hood are a bag of *Pleurotus ostreatus* grain inoculum, a mixing bowl, polyethylene molds, pre-sterilized textiles, and a scale.

The inoculum of *Pleurotus ostreatus* then is added in an amount of 180 g per 2.5 liters of rice hull and oat hull substrate. The mixture of rice hull and oat hull substrate and *Pleurotus ostreatus* inoculum then is formed in textile-lined polyethylene molds, and then allowed to incubate for 6 days.

Upon full colonization, the resulting biocomposites are ejected from the molds and go through chemical treatments. Each biocomposite is submerged in a solution of 25 ml glycerin and 75 ml tap water for up to 72 hours. The biocomposites then are dried at 200° F. or above for up to 48 hours.

The disclosures of all patents and publications (including published patent applications) are hereby incorporated by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A method of producing an absorbent biocomposite material comprising:
   (a) mixing at least one mycological material with at least one lignocellulosic material to provide a biocomposite material comprising said at least one mycological material and said at least one lignocellulosic material; and
   (b) contacting said biocomposite material of step (a) with at least one substance that increases the hydrophilicity of said biocomposite material, thereby providing said absorbent biocomposite material.

2. The method of claim 1 wherein said at least one mycological material is at least one fungus or fungal tissue.

3. The method of claim 2 wherein said at least one fungus or fungal tissue is selected from the phyla Ascosmycota, Zygomycota, and Basidiomycota, and combinations thereof.

4. The method of claim 2 wherein said at least one fungus or fungal tissue is of the species *Pleurotus ostreatus*.

5. The method of claim 2 wherein said at least one fungus or fungal tissue is of the species *Polyporus squamosus*.

6. The method of claim 2 wherein said at least one fungus or fungal tissue is of the species *Rhizopus microspores* var. *oligosporus*.

7. The method of claim 2 wherein said at least one fungus or fungal tissue is of the species *Ganoderma lucidum*.

8. The method of claim 2 wherein said at least one fungus or fungal tissue is of the species *Schizophyllum commune*.

9. The method of claim 1 wherein said at least one lignocellulosic material comprises wood.

10. The method of claim 1 wherein said at least one lignocellulosic material comprises corn fibers.

11. The method of claim 1 wherein said at least one lignocellulosic material comprises grain hulls.

12. The method of claim 11 wherein said grain hulls are selected from the group consisting of rice hulls, oat hulls, and mixtures thereof.

13. The method of claim 1 wherein said substance that increases the hydrophilicity of said biocomposite material is a base.

14. The method of claim 1 wherein said at least one substance that increases the hydrophilicity of said biocomposite material is an alkali hydroxide.

15. The method of claim 14 wherein said alkali hydroxide is sodium hydroxide.

16. The method of claim 14 wherein said alkali hydroxide is potassium hydroxide.

17. The method of claim 1 wherein said at least one substance that increases the hydrophilicity of said biocomposite material is an amine.

18. The method of claim 1 wherein said at least one substance that increases the hydrophilicity of said biocomposite material is sodium borohydrate.

19. The method of claim 1 wherein said at least one substance that increases the hydrophilicity of said biocomposite material comprises sodium hydroxide and carboxymethyl chloride.

* * * * *